United States Patent Office 2,976,285
Patented Mar. 21, 1961

2,976,285

METAL CHELATES AND PROCESS OF PREPARING SAME

Virgil W. Gash, Dayton, Ohio, assignor to Monsanto Chemical Company, St. Louis, Mo., a corporation of Delaware No Drawing. Filed May 9, 1956, Ser. No. 583,629

19 Claims. (Cl. 260—242)

The present invention provides a new process for the preparation of metal carbonyl complexes. The new process involves the treatment of a β-amino α,β-unsaturated carbonyl compound with a polyvalent metal ion, the amino group being cleaved from the carbonyl compound, while the rest of the carbonyl compound forms a complex with the metal.

The new process of my invention is represented by the equation:

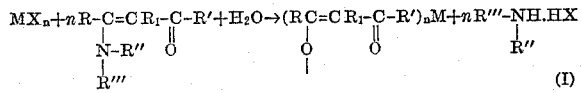

(I)

in which M is a metal atom, $n$ is an integer from 2 to 4, and X is a monovalent salt anion, R, R' and $R_1$ are organic radicals, e.g., alkyl, acyl, alkoxy, aryl, aralkyl, aroyl, alkaryl, heterocyclic, or cycloaliphatic radicals, and R and $R_1$ can also be hydrogen and R" and R'" are hydrogen or organic radicals, e.g., cycloaliphatic, acyl, alkyl, alkaryl, aryl, or aralkyl radicals, or R" and R'" together form a heterocyclic ring with the amino nitrogen atom. Of course, X can also be a divalent or trivalent salt anion in my process.

The present invention is also directed to a novel calcium chelate having useful gelling properties. Certain novel β-amino α,β-unsaturated carbonyl compounds and methods of making these compounds are also disclosed herein.

It is an object of the present invention to provide a simple process for preparing metal carbonyl complexes in pure form. It is also an object to provide a process for preparing metal carbonyl complexes in good yield with a short reaction time.

It is known that certain metals, particularly multivalent heavy metals, are capable of forming complexes or chelates with carbonyl compounds. However, prior art procedures for forming such complexes are not entirely satisfactory. The common procedure is to add a solution of a salt of a complex-forming metal to a solution of a 1,3-dicarbonyl compound, and then to add alkali solution in the amount required to neutralize the acid formed from the salt anion. This procedure is somewhat tedious due to the care required in the neutralization step, and the difficulty sometimes encountered in washing the product free of salts. Prior procedures using buffering agents rather than alkali are subject to similar difficulties.

It has now been discovered that if the solution of a salt of a complex-forming metal is reacted with a β-amino α,β-unsaturated carbonyl compound rather than with a 1,3-dicarbonyl compound, no neutralization or buffering step is necessary, and the desired metal carbonyl complexes are formed rapidly and in good yield.

The following examples illustrate certain embodiments of my invention.

*Example 1*

A solution of 25 grams of acetylacetone, 55 grams of diethylamine, and 0.5 gram of p-toluenesulfonic acid monohydrate in 150 ml. of benzene was refluxed for 4 hours. The colorless solution turned red, but no separation of water occurred. After distillation of the solvent, the residue was distilled at reduced pressure to yield 22.8 grams of a yellow oil. Redistillation through a 14-inch jacketed Vigreux column yielded 18.5 grams (47.5%) of 4-diethylamino-3-penten-2-one, B.P. 75–80° C. 0.3 mm. Hg, $n_D^{26}$ 1.5385, sp. gr.$_4^{20}$ 0.938. This amino ketone is soluble in water and most organic solvents.

*Analysis.*—Calc'd. for $C_9H_{15}NO_2$: C, 63.87; H, 8.93; N, 8.34. Found: C, 63.35; H, 8.68; N, 8.16.

A solution of 3.66 grams of the 4-diethylamino-3-penten-2-one in 10 ml. of water was added to a solution of 1.58 grams of cupric chloride in 10 ml. of water. A blue precipitate formed immediately. After sitting overnight at 25° C., the mixture was filtered yielding 2.80 grams of product, M.P. >300° C. A small sample was recrystallized from ethanol to yield blue needles. The product was insoluble in water, but soluble in dilute acid to give a colorless solution which turned blue upon addition of alkali.

*Analysis.*—Calc'd. for $C_{10}H_{14}CuO_4$: C, 45.88; H, 5.39. Found: C, 46.07; H, 5.83.

*Example 2*

A solution of 25.8 ml. of acetylacetone and 65 ml. of morpholine in 200 ml. of benzene was refluxed for 20 hours while 6 ml. of water was collected. Solvent and excess morpholine were removed by distillation and the residue was distilled at reduced pressure to give 34.8 grams (82%) of 4-(N-morpholino)-3-penten-2-one, B.P. 105–110° C./0.3 mm. Hg, M.P. 46–48° C. This amino ketone is soluble in water and in most organic solvents.

*Analysis.*—Calc'd. for $C_9H_{15}NO_2$: C, 63.87; H, 8.93; N, 8.34. Found: C, 63.35; H, 8.68; N, 8.16.

Cupric chloride, 1.59 grams, and 4 grams of 4-(N-morpholino)-3-penten-2-one were reacted in a procedure similar to that of Example 1 to yield 2.93 grams of a blue product identical in chemical and physical properties to the acetylacetone-cupric copper complex obtained in Example 1.

*Example 3*

A solution of 2.61 grams (0.0168 mole) of 4-diethylamino-3-penten-2-one in 10 ml. of water was mixed with a solution of 2 grams (0.0084 mole) of nickel chloride hexahydrate in 10 ml. of water. After heating for 5 minutes, the blue-green crystalline product precipitated. Filtration gave 2.02 grams of product, 87.8% of the theoretical yield. Recrystallization from ethanol gave green crystals, M.P. 230° C. (decomposition).

*Analysis.*—Calc'd. for $C_{10}H_{14}NiO_4 \cdot H_2O$: C, 43.69; H, 5.87. Found: C, 44.09; H, 6.24.

The compound lost its water of hydration when it was heated at 90 to 100° C.

*Example 4*

A solution of 25 ml. morpholine in 150 ml. benzene was dried by azeotropic distillation. Then 21.73 grams (0.129 mole) of acetyl-2-thenoyl methane was added, followed by a trace of p-toluenesulfonic acid hydrate. The solution was refluxed for 15 hours. The solution was evaporated on a hot water bath under water pump vacuum, and the residue cooled to a crystalline mass. A solution made up of 1 part ether and 2 parts Skellysolve B (a petroleum ether) was added, and the product was filtered out, 27.6 grams in amount, of M.P. 90–98° C. The product gave the following analysis:

Calc'd for $C_{12}H_{15}NO_2S$: C, 60.73; H, 6.37; N, 5.90; S, 13.51. Found: C, 61.15; H, 6.53; N, 5.70; S, 13.25.

Ultraviolet analysis showed a max. at 258 mµ with a shoulder at 280 mµ and also a max. of very high intensity at about 355 mμ, indicating that the structure was that of 4-(N-morpholino)-4-(2-thienyl)-3-buten-2-one; a positive iodoform test confirmed this structure.

A solution of 2.37 grams (0.01 mole) of the above ketoenamine in 30 ml. ethanol was mixed with a solution of 1.23 grams MgSO$_4$·7H$_2$O (0.005 mole) in 10 ml. water. The reaction mixture was heated on a steam bath and water was added dropwise until the solution was completely homogeneous. The solution stood overnight, and the heavy cream-colored precipitate was then filtered and washed with water. A small sample of the product left a white residue upon ignition. The product was soluble in methyl alcohol, ethyl alcohol, acetone, and dimethyl formamide, and insoluble in tertiary butyl alcohol, ether, Skellysolve B and ethyl acetate. The product was recrystallized from ethanol and water to give a cream-colored material which melted at 260° C. with decomposition.

*Analysis.*—Calc'd. for C$_{16}$H$_{14}$MgO$_4$S$_2$: C, 53.57; H, 3.93. Found: C, 53.35; H, 4.54.

The infrared spectrum was of the type typical of metal chelates of unsaturated carbonyl compounds.

The structure of the compound can be represented by the following formula:

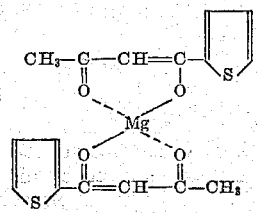

in which the dotted lines represent co-ordinate co-valences.

*Example 5*

A solution of 2.37 grams of 4-(N-morpholino-4-(2-thienyl)-3-buten-2-one in 20 ml. ethanol was mixed with 0.85 gram CuCl$_2$·2H$_2$O dissolved in 10 ml. of 50:50 ethanol and water. A dark, completely homogeneous solution was produced, but, after several seconds, a precipitate suddenly separated from the solution. The green precipitate was filtered and dried to a weight of 1.91 grams, for a crude yield of 96%. Recrystallization from ethanol-acetone and then from ethanol gave bright green shiny needles. When the needles were dried at 100° C./0.3 mm. there occurred a transition to a pale green amorphous state. Apparently the crystals are a hydrate or alcoholate. The melting point of the dried compound was 235–237° C. (dec.).

Infrared analysis showed the typical shift of the carbonyl band to longer wave lengths, i.e., at about 6.36μ (1560 cm.$^{-1}$).

*Analysis.*—Calc'd. for C$_{16}$H$_{14}$CuO$_4$S$_2$: C, 48.29; H, 3.55. Found: C, 48.38; H, 4.10.

There was negligible absorption in the near infrared region. The copper chelate product can be represented by the formula:

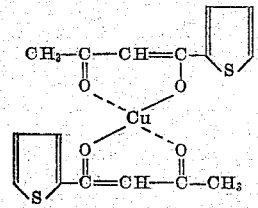

*Example 6*

A solution of 2.37 grams of 4-(N-morpholino)-4-(2-thienyl)-3-buten-2-one in 15 ml. warm ethanol was mixed with a solution of 1.19 grams NiCl$_2$·6H$_2$O in 5 ml. of water. The reaction mixture was warmed about 30 seconds on a steam bath, and then water was added dropwise, causing precipitation of a pale green product. Further addition of water caused additional heavy precipitation. The product was filtered, washed with water, and dried at 70° C. The dried product was recrystallized from methanol to give green crystals, of melting point 128° C. with foaming. One sample of the dried amorphous product was further dried at 55° C./0.05 mm. over PCl$_5$ to give a product melting at 170–175° C. with decomposition. Infrared analysis (of the 130° M.P. sample) showed the absorption typical of this type metal chelate. A broad intense band in the OH region indicated a definite hydrate. Near infrared analysis (of the 170–175° C. melting product) indicated no appreciable absorption at 0.8μ. A sample of the crystalline material was dried at 100° C./0.05 mm. over PCl$_5$ to obtain a product melting at 173° C. with decomposition. This product gave the following analysis:

Calc'd. for C$_{16}$H$_{14}$O$_4$S$_2$Ni: C, 47.8; H, 3.5. Found: C, 48.57; H, 4.01.

This nickel chelate apparently exists in different states of hydration, depending upon the method of handling.

*Example 7*

A solution of 2.37 grams of 4-(N-morpholino)-4-(2-thienyl)-3-buten-2-one was mixed with a solution of 0.88 gram Ni(OAc)$_2$ in 10 ml. water. The product was precipitated and worked up as in the previous example, to give a crude product melting at 128° C., and further products melting at 130° C., or 170–175° C., depending upon the method of drying. There was no depression in melting point when the 170–175° C. melting product was mixed with the corresponding product from Example 6, thereby indicating that the anionic portion of the metal salt reactant has no important influence on the course of the reaction.

*Example 8*

A solution of 0.99 gram of FeCl$_2$·4H$_2$O in 5 ml. water was mixed with a solution of 2.37 grams of 4-(N-morpholino)-4-(2-thienyl)-β-buten-2-one in 10 ml. warm ethanol. The mixture was warmed on a steam bath, and after about 15 seconds, the deep blood red solution deposited a voluminous precipitate. About 25 ml. of water was added, and the material stood overnight. The heavy, purple-colored precipitate was filtered, washed with water, and placed in an oven at 70° C. and dried to a maroon red color. The product melted at 230° C. with decomposition. The product was recrystallized from benzene and Skellysolve B, and washed with Skellysolve B to give shiny, deep red crystals. There was negligible absorption in the near infrared and the infrared absorption was typical for a chelate of this type.

*Example 9*

A solution of 2.37 grams (0.01 mole) of 4-(N-morpholino)-4-(2-thienyl)-3-buten-2-one in 10 ml. ethanol was mixed with a solution of 0.56 gram CaCl$_2$ (0.005 mole) in 5 ml. water and 5 ml. ethanol. The mixture was warmed on a steam bath for 5 minutes, diluted to 50 ml., and allowed to stand at room temperature. After about 15 minutes crystals began to separate. The mixture was warmed again, diluted to 150 ml., and allowed to stand overnight. The precipitated crystals were removed by filtration, washed with distilled water, and dried at 70° C. to give 1.52 grams of product as gold-colored crystals. Upon ignition, the material left a white residue. The product was soluble in hot liquids such as benzene, ether, chloroform, carbon tetrachloride and xylene, and the solutions set to a gel upon cooling. The product was recrystallized from aqueous ethanol to give gold-colored leaflets which sinter at 140° but do not completely melt until decomposition at 270° C.

The calcium chelate, 50 mg., was heated to boiling in 5 grams of benzene, and then cooled to give a solid immobile gel which did not flow when the container was inverted.

It appears that the calcium portion of the chelate is responsible for its gelling properties, as this same ligand has been used in the chelation of other metals and the chelates did not have the ability to "gel" organic solvents. The organic portions of the chelate can be varied considerably without destroying its gelling properties. In fact, the organic portion can be varied to make the chelate applicable to the gelation of various solvents.

The calcium (2-thenoyl)acetonate gave negative tests for nitrogen and halogen, and the following sulfur analysis:

Calc'd. for $C_{16}H_{14}CaO_4S_2$: S, 17.12%. Found: S, 17.00%.

Example 10

A solution of 0.62 gram (1.67 mmoles) of

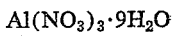

in 10 ml. water was mixed with a solution of 1.19 grams (5 mmoles) of 4-(N-morpholino)-4-thienyl-3-buten-2-one in 15 ml. warm ethanol. A completely homogeneous solution resulted, followed in about 10 seconds by a heavy precipitate. The mixture was warmed on a steam bath for about 5 minutes, diluted to 50 ml. with water, and kept at room temperature. The precipitate was filtered, washed with water, and air dried to give 0.79 gram of yellow powder of M.P. 235–8° C. (dec.). A sample was recrystallized from acetone-Skellysolve B solution, M.P. 233–237° C. (dec.).

Analysis.—Calc'd. for $(C_8H_7O_2S)_3Al$: C, 54.53; H, 4.05. Found: C, 54.75; H, 4.53.

The compound is the desired trichelate of aluminum. Infrared analysis was typical, i.e., the carbonyl bands were pushed to much longer wave lengths. The chelate can be represented by the following formula:

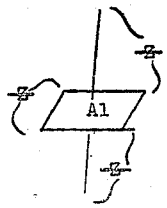

in which

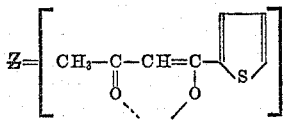

Example 11

Isonicotinoyl pivalyl methane, 8 grams, and 15 ml. of piperidine in 150 ml. of benzene containing a catalytic amount of p-toluenesulfonic acid was refluxed for four hours. The solution was evaporated under water pump vacuum to leave a residue which partially crystallized upon standing. The residue was distilled through a column, the fractions distilling at 92 to 100° C./0.1–0.2 mm. being collected.

Infrared analysis showed the typical shift of carbonyl absorption to longer wave lengths.

A solution of 1.19 grams of $CoCl_2 \cdot 6H_2O$ in 5 ml. water and 5 ml. ethanol was mixed with 2.72 grams of the 1-pivalyl-2(N-piperidyl)-2-(γ-pyridyl)ethylene. An orange precipitate separated immediately. Water, 2.5 ml., was added to the reaction mixture, and the mixture was warmed on a steam bath for 10 minutes and filtered. The filtered solids were washed with water and dried to 1.70 grams of yellow-orange powder, for a yield of 72.7%. The cobalt chelate product gave the following analysis:

Calc'd. for $C_{24}H_{28}N_2O_4Co$: C, 61.66; H, 6.04; Co, 12.61. Found: C, 61.87; H, 6.54; Co, 12.45 (by residue).

Infrared analysis showed the typical lack of carbonyl bands, the first band in this region occurring at 6.23μ. The chelate can be represented by the formula:

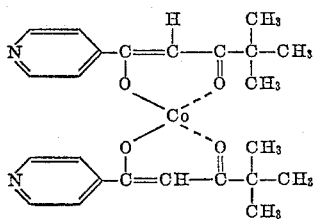

Example 12

In aqueous ethanol solution, 4-(N-morpholino)-4-(2-thienyl)-3-buten-2-one was reacted with $CoCl_2 \cdot 6H_2O$ according to the procedure of Example 6. A yellow-orange chelate was obtained, melting at 147° C. The chelate was crystallized from methanol-water as a yellow-orange hydrate which changed to a grayish-tan color up on heating under vacuum. Infrared and elemental analysis indicated that the yellow-orange product was the dihydrate of the cobalt chelate, having the empirical formula

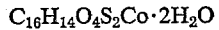

Example 13

A solution of 2.78 grams of benzoyl-2-furoyl methane and 4 ml. piperidine in 60 ml. of dry benzene containing a catalytic amount of p-toluenesulfonic acid was refluxed for 4 hours. The solvent was evaporated under vacuum and the thick, oily residue was crystallized to a solid mass. The crude product was taken up in hot Skellysolve B, and decanted from the tarry insoluble residue. Upon cooling, yellow crystals were obtained, and the crystals were filtered, washed with Skellysolve B, and air dried, to give a 3-(N-piperidino)-3-phenyl-1-(2-furyl)-2-propen-1-one product of M.P. 90–106° C. (probably a cis-trans mixture).

A solution of 2.15 grams (0.00765 mole) of the above keto enamine in 15 ml. ethanol was mixed with a solution of 0.52 gram (0.00382 mole) $ZnCl_2$ in 10 ml. water and 5 ml. ethanol, whereupon an instantaneous precipitation occurred, to give a cream-colored product. The product was filtered, washed with water, and dried to 1.55 grams of the zinc chelate, a lemon-colored solid. The chelate was recrystallized from ethanol to give lemon-yellow crystals, which melted at 130–136° C., and then partially resolidified to again melt at about 170° C.

Analysis.—Calc'd. for $C_{26}H_{18}O_6Zn \cdot 1.5H_2O$: C, 60.19; H, 4.08. Found: C, 60.28; H, 4.08.

Infrared analysis indicated the hydrate form. The structure of the zinc chelate can be represented by the formula:

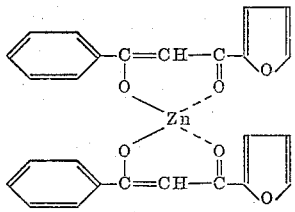

Example 14

A solution of 50 grams of acetylacetone in 250 ml. of benzene was refluxed to remove water (Dean-Stark water trap). Then 50 grams of cyclohexylamine was added dropwise at a sufficient rate to maintain a gentle reflux. After 3 hours, 8.3 ml. of water had separated. The solution was evaporated by heating under vacuum, leaving a mixture of oil and solid (possibly cis-trans isomers). The product was distilled through a column to give 86.4 grams of the 4-cyclohexylamino-3-penten-2-one, of refractive index $N_D^{25}$ 1.5315.

*Analysis.*—Calc'd. for $C_{11}H_{19}NO$: C, 72.86; H, 10.56; N, 7.72. Found: C, 73.30; H, 10.70; N, 7.64.

Ultraviolet absorption showed a maximum (ethyl alcohol) at 316 mμ, and infrared analysis indicated that the β-amino group had shifted the α,β-unsaturated carbonyl bands to longer wave lengths, i.e., 6.15μ and 6.26μ.

A solution of 4-cyclohexylamino-3-penten-2-one, 1.81 grams (0.01 mole), in 20 ml. ethanol was mixed with a solution of 0.85 gram (0.005 mole) of $CuCl_2 \cdot 2H_2O$ in 10 ml. water. A brown solution was obtained which changed to a pale green colloidal (turbid) solution. The solution was heated on a steam bath and diluted to 50 ml. with water. After 5 to 8 minutes' heating a blue, crystalline precipitate began to appear. The mixture was heated several more minutes, then allowed to stand overnight. The precipitate was filtered and washed with water to give 1.1 grams of silvery blue crystals (not completely dry). A sample was recrystallized from hot ethanol; the chelate changed to a brown solid at 270° C. which does not melt up to 300° C. Qualitative analysis indicated no nitrogen or halogen in the chelate compound. Quantitative analysis of carbon and hydrogen showed:

Calc'd. for $C_{10}H_{14}CuO_4$: C, 45.88; H, 5.39. Found: C, 46.55; H, 5.95.

The analyses indicate the cupric acetylacetonate, the same chelate as was previously prepared by reaction of enamines containing different amino groups. The infrared absorption spectrum was identical to that obtained on the cupric acetylacetonate of Examples 1 and 2.

The above keto enamine failed to react with $MgSO_4$ in aqueous ethanol after several minutes heating on the steam bath. Dilution with water caused separation of the oily enamine.

*Example 15*

A solution of 25 grams (0.25 mole) of acetylacetone and 74 ml. (0.75 mol) of piperidine in 150 ml. of benzene was refluxed for 8 hours. The reaction was essentially complete after 4 hours, as evidenced by the 4.4 ml. of water of reaction that was collected. Distillation of the solution through a 21-inch jacketed Vigreux column yielded 23.8 grams (57%) of 4-(N-piperidino)-3-penten-2-one, $n_D^{25}$ 1.5660, B.P. 90–100° C./0.3 mm. Hg. The yellow oil crystallized almost immediately, M.P. 50–54° C. A sample was redistilled for analysis, B.P. 90–91° C./0.2 mm. Hg, M.P. 51–54° C.

$\lambda_{max}^{alc}$ 314 mμ

*Analysis.*—Calc'd. for $C_{10}H_{17}NO$: C, 71.81; H, 10.01; N, 8.38. Found: C, 71.91; H, 10.50; N, 8.46.

Infrared analysis showed absorption bands in the range of 6.1–6.2μ.

Cupric acetylacetonate can be formed from this enamine by following the procedure of Example 1.

It is well known that compounds containing the structure

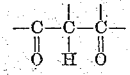

are capable of existing in tautomeric forms, such as the enol form

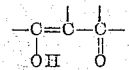

and that they will react with metal salts to form metal carbonyl complexes. A novel feature of my invention is the use of an amino group in place of the hydroxyl group of the enol form, the amino group being capable of hydrolysis in the presence of water and the metal salt to give the desired metal carbonyl complex.

As known to those skilled in the art, the above 1,3-dicarbonyl structure can have various types of organic radicals as substituents without destroying its tautomerism or complex-forming ability. Similarly, the β-amino α,β-unsaturated carbonyl compounds used in my process can have various substituents, as illustrated by the following compounds: 4-diethylamino-3-penten-2-one, 4-(N-morpholino)-3-penten-2-one, 4-(N-morpholino)-4-(2-thienyl)-3-buten-2-one, 3-(N-piperidino)-3-phenyl-1-(2-furyl)-2-propen-1-one, 4-(N-morpholino)-4-(2-thienyl)-1-phenyl-3-buten-2-one, 1-(N-morpholino)-1-(2-thienyl)-4-ethoxy-1-octen-3-one, 4-ethylmethylamino-4-acetyl-3-buten-2-one, 4-(N-anilino)-3-penten-2-one, 4-cyclohexylamino-3-penten-2-one, 2-(N-morpholino)-1-carbethoxy-1-propene, the N-piperidino derivative of the enol form of diethyl acetylmalonate, the N-morpholino derivative of the enol form of diethyl benzoyl malonate, 2-carbethoxy-1-(N-morpholino)-cyclohex-1-ene, 4-diphenylamino-5-phenyl-3-penten-2-one, 1-(N-morpholino)-1-penten-3-one, 4-amino 3-penten-2-one, 4-di-(β-hydroxyethyl)-amino-3-penten-2-one, 4-(N-piperidino)-4-(2-thienyl)-1-trifluoro-3-buten-2-one, etc.

The present process is particularly directed to the formation of metal chelates from β-amino α,β-unsaturated ketones and esters. The ketones and esters are usually more readily available than other β-amino α,β-unsaturated carbonyl compounds; moreover, these amino ketones and esters are not subject to tautomerization as are β-amino α,β-unsaturated aldehydes when the amino group is secondary. These preferred β-amino α,β-unsaturated ketones and esters can be represented by the formula:

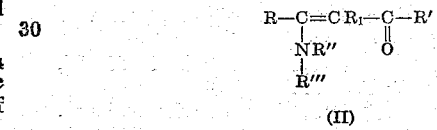

(II)

in which R and R' are any of the groups listed above with respect to Formula I, except hydrogen, and $R_1$, R", and R''' are any of the groups listed above with respect to Formula I. The preferred β-amino α,β-unsaturated ketones and esters are bases.

Although in its broadest aspects the process is applicable to β-amino α,β-unsaturated carbonyl compounds in which the amino group is primary, secondary, or tertiary, it is very much preferred that the amino group be tertiary, i.e., that neither R" or R''' in the formula above be hydrogen. The use of a tertiary amino group insures a rapid, complete reaction. When a secondary or primary amine is used, the reaction is slow and may not proceed at all with some metal salts; moreover, in some cases unwanted complexes may be produced in which the amino group is still present on the carbonyl compound.

It is ordinarily of no great importance which particular tertiary amino substituent is used, as the amino group is cleaved in my process and does not form part of the final chelate product. However, it is desirable that the amino substituent be prepared from an inexpensive amine, e.g., morpholine or piperidine.

The process of the present invention is conveniently conducted in aqueous solution. Most of the metal salts are soluble in water, and few of them are readily soluble in many other solvents. Some of the β-amino α,β-unsaturated carbonyl compounds are fairly soluble in water, and the solubility of the compounds can be increased, if necessary, by the addition of an alcohol, e.g., ethanol, methanol, n-propanol, isopropyl alcohol, etc. The metal chelate products are insoluble in water, and precipitate readily from aqueous solutions.

Although aqueous solutions are the most convenient media for the reaction, the reaction can be conducted in other suitable solvents. It is only necessary to select solvents which will dissolve both the chosen β-amino α,β-unsaturated carbonyl compound, and the chosen metal salt; for example, cupric chloride and 4-(N-morpholino)-4-(2-thienyl)-3-buten-2-one are both fairly soluble in ethyl alcohol. However, even when non-aqueous solvents are used, water will ordinarily still be present in the reaction mixture, either because the selected solvent is not strictly anhydrous, or because the metal salt is hydrated.

The process of the present invention is applicable to a broad group of chelate-forming metal ions. The metals are generally added to the reaction medium as a salt of some kind, or a solution of a salt, but the character of the anionic portion of the salt is ordinarily of little importance, except for whatever effect it may have upon solubility in the chosen reaction medium. Among the metal ions which will form the desired chelates are $Cu^{++}$, $Mg^{++}$, $Fe^{++}$, $Ni^{++}$, $Co^{++}$, $Ca^{++}$, $Ti^{++++}$, $Mn^{++}$, $Zn^{++}$, $Al^{+++}$, $Sn^{+++}$, $Sb^{+++}$, $Pb^{++++}$, $Hg^{++}$, $Ba^{++}$, $Sr^{++}$, $Cr^{+++}$, etc.; some of the more preferred ions are $Cu^{++}$, $Mg^{++}$, $Fe^{++}$, $Ni^{++}$, $Co^{++}$, $Ca^{++}$, $Zn^{++}$ and $Al^{+++}$. The ions can be used in the form of their various salts; however, as aqueous solvents are ordinarily used, it is preferred to use salts which are fairly water soluble. Some of the preferred metal salts are the chlorides, bromides, acetates (or salts of other organic acids), and in some cases, the sulfates and nitrates. Various other metal salts can also be used, such as the carbonates, chlorates, percarbonates, arsenates, etc. Examples of a few of the applicable salts are cuprous chloride, magnesium sulfate, ferrous chloride, nickel chloride, nickel acetate, cobalt chloride, calcium chloride, zinc chloride, and aluminum nitrate.

It will be observed that most of the applicable metal ions have an atomic number of at least 20. Moreover, most of the metal ions are divalent or trivalent, the divalent ions being especially useful. It will also be noted that most of the ions are ions of metals which belong to the class of heavy metals (Lange's Handbook of Chemistry, sixth edition, pages 59 and 60).

While the process is particularly directed to preparation of chelates of single metals, it is also contemplated that mixtures of salts of different metals can be used to prepare mixed chelate compositions.

While it is ordinarily preferred that the metal be in the form of a salt for the reaction, it is also contemplated that part of the principal valences of the metal can be satisfied by organic radicals, e.g., by hydrocarbon or substituted hydrocarbon radicals. As examples may be mentioned such salts as dibenzyl tin dichloride, diethyl tin diacetate, diphenyl lead dibromide, etc. The use of these salts results in chelate products having principal valences satisfied by the organic radicals, as well as the principal and co-ordinate valences satisfied by the chelate groups.

The metal salts and β-amino α,β-unsaturated carbonyl compounds can be reacted in various proportions to give the desired chelate products. It is preferred to have approximately the stoichiometric amount of carbonyl compound required to satisfy all the ionic valences of the metal, i.e., sufficient to replace each anion of the salt with a chelate group. If lesser amounts of the carbonyl compound are used, the same chelate product is produced, but all of the metal salt is not reacted; if greater amounts of carbonyl compound are used, the same product is obtained, but all of the carbonyl compound is not reacted. It is ordinarily desirable to use about 0.5 to 1.5 stoichiometric equivalents of β-amino α,β-unsaturated carbonyl compound for each equivalent of metal salt.

The metal chelate products of my new process have many valuable uses, e.g., as polymerization catalysts, gelling agents, chemical intermediates, semi-conductors, as the active ingredient in insecticidal, fungicidal, or bactericidal compositions, as medicinal or pharmaceutical agents, as fuel additives, etc. My novel calcium (2-thenoyl)acetonate is especially useful as a gelling agent, particularly for organic solvents, and among the possible applications are as additives in lubricating greases, printing inks and pastes, paste polishes, paint removers, plastisols and plastigels, plastisol foams, etc. Moreover, as my process involves the chelation of metal ions by β-amino α,β-unsaturated carbonyl compounds, it is evident that such carbonyl compounds are useful as metal scavenger agents, precipitants, etc. The β-amino α,β-unsaturated carbonyl compounds can be added to rubber compositions, fats and oils, gasoline, etc. as metal deactivators. Traces of Cu, Co, Fe, etc. accelerate the aging of rubber, the development of rancidity in fats and oils, and the formation of gums in gasoline, and the presence of small amounts of the β-amino α,β-unsaturated carbonyl compounds aids in retarding these reactions by rendering the metals inactive.

The structural formulae in the examples above are considered to be properly representative of the chelate products of my process. The dotted lines in the formulae are considered coordinate valences; such valences are indicated by the absence of normal carbonyl stretching vibrations in the infrared region. However, I do not wish to be bound by any theory of the structure of the chelate product; regardless of what the structure of the product may be, it is apparent that my process produces a metal complex (metal enolate) of a 1,3-dicarbonyl compound, and that the amino group is cleaved during the reaction and does not appear in the product.

A method of preparing metal carbonyl complexes by the reaction of β-amino α,β-unsaturated carbonyl compounds with polyvalent metal ions has been described. The procedure is simple, gives good yields, and requires only a short reaction time. The calcium chelate of acetyl-2-thenoyl methane has been described. Certain novel β-amino α,β-unsaturated carbonyl compounds and their methods of preparation have been described.

I claim:

1. A process for the preparation of metal complexes of diketones which comprises contacting a β-amino α,β-olefinically unsaturated ketone with a metal salt of a chelate-forming metal to produce a metal chelate of the diketone corresponding to the said ketone in which the said β-amino group has been replaced by an oxygen atom.

2. The process of claim 1 in which the amino group of the ketone is a tertiary amino group, and in which the metal salt with which the compound is treated is a heavy metal salt.

3. A process for the preparation of metal complexes of diketones which comprises mixing a β-amino α,β-olefinically unsaturated ketone, the said ketone being hydrocarbon except for the keto oxygen and amino nitrogen, with a metal salt of a chelate-forming metal of atomic number of at least 20 but no greater than 82 in aqueous solution, and separating the resulting precipitate from the solution to obtain a metal chelate of the diketone corresponding to the said ketone in which the said β-amino group has been replaced by an oxygen atom.

4. The process of claim 2 in which the β-amino group is the morpholino group.

5. The process of claim 2 in which the amount of the metal salt is stoichiometrically equivalent to the amount of the ketone, in order to have all the ionic valences of the metal satisfied by carbonyl complex linkages.

6. A process for the preparation of metal chelates of carbonyl compounds which comprises contacting a β-amino α,β-unsaturated ketone, the said amino group being tertiary, in aqueous solution with chelate-forming metal ions of ionic valence from 2 to 3, about 0.5 to 1.5 stoichiometric equivalents of said unsaturated ketone being present for each stoichiometric equivalent of metal ions to obtain metal chelates of the corresponding diketones in which the said β-amino has been replaced by oxygen.

7. The method of claim 6 in which the amount of β-amino α,β-unsaturated ketone is that stoichiometrically required to satisfy all of the ionic valences of the metal ions, and in which the metal ions were formed by adding a water soluble metal salt.

8. The method of claim 6 in which the metal ions are formed by adding cupric chloride.

9. The method of claim 6 in which the metal ions are formed by adding nickel chloride.

10. The method of claim 6 in which the said $\alpha,\beta$-unsaturated ketone is treated with an aqueous solution of calcium chloride.

11. The method of claim 6 in which the said $\alpha,\beta$-unsaturated ketone is treated with an aqueous solution of cobaltous chloride.

12. The method of claim 6 in which the said $\alpha,\beta$-unsaturated ketone is treated with an aqueous solution of zinc chloride.

13. The method of claim 6 in which the said $\alpha,\beta$-unsaturated ketone is treated with an aqueous solution of aluminum nitrate.

14. The method of claim 6 in which the $\beta$-amino $\alpha,\beta$-unsaturated ketone is a $\beta$-amino-3-penten-2-one.

15. The method of claim 6 in which the $\beta$-amino group is the morpholino group.

16. The method of claim 6 in which the $\beta$-amino $\alpha,\beta$-unsaturated ketone is 1-pivalyl-2-(N-piperidyl)-2-($\gamma$-pyridyl)ethene.

17. As a new compound, the calcium chelate of acetyl-2-thenoylmethane.

18. A process for the preparation of metal chelates of diketones which comprises contacting a $\beta$-amino $\alpha,\beta$-unsaturated ketone, the said amino group being tertiary and the said ketone being hydrocarbon except for the keto oxygen and the amino nitrogen, in aqueous solution with water soluble ions of metals selected from the group consisting of copper, magnesium, iron, nickel, cobalt, calcium, titanium, manganese, zinc, aluminum, tin, antimony, lead, mercury, barium, strontium, and chromium, about 0.5 to 1.5 stoichiometric equivalents of said unsaturated ketone being present for each stoichiometric equivalent of metal ions, to obtain a metal chelate of the diketone corresponding to the said ketone in which the said $\beta$-amino group has been replaced by an oxygen atom.

19. A method of preparing the calcium chelate of acetyl-2-thenoylmethane which comprises warming over a steam bath an aqueous mixture consisting of water, 4-(N-morpholino)-4-(2-thienyl)-3-buten-2-one and calcium chloride to obtain the said calcium chelate.

References Cited in the file of this patent

UNITED STATES PATENTS 2,278,965     Van Peski _____ Apr. 7, 1942

FOREIGN PATENTS 1,065,497     France _____ Jan. 13, 1954

OTHER REFERENCES

Cromwell et al.: Journal of Organic Chemistry, vol. 14 (1949), pp. 411–420.

Berg et al.: Analytical Chemistry, vol. 27, July 1955, pp. 1131–1134.

Harris et al.: Journal American Chemical Society, vol. 70, October 1948, pp 3360–3361.

Reid et al.: Journal American Chemical Society, vol. 72, July 1950, pp. 2948–2952.

UNITED STATES PATENT OFFICE
CERTIFICATE OF CORRECTION

Patent No. 2,976,285                      March 21, 1961

Virgil W. Gash

It is hereby certified that error appears in the above numbered patent requiring correction and that the said Letters Patent should read as corrected below.

Column 1, line 45, for "purse" read -- pure --; column 7, line 21, for "to" read -- no --.

Signed and sealed this 21st day of May 1963.

(SEAL)
Attest:

ERNEST W. SWIDER
Attesting Officer

DAVID L. LADD
Commissioner of Patents